{> US009291376B2

(12) United States Patent
Ushijima et al.

(10) Patent No.: US 9,291,376 B2
(45) Date of Patent: Mar. 22, 2016

(54) AUXILIARY HEATER CONTROL DEVICE, HEATED FLUID UTILIZATION SYSTEM, AND AUXILIARY HEATER CONTROL METHOD

(75) Inventors: Takahiro Ushijima, Tokyo (JP); Kazutaka Suzuki, Tokyo (JP); Koji Matsuzawa, Tokyo (JP); Nobuaki Uehara, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 828 days.

(21) Appl. No.: 13/511,478

(22) PCT Filed: Nov. 25, 2009

(86) PCT No.: PCT/JP2009/069821
§ 371 (c)(1),
(2), (4) Date: May 23, 2012

(87) PCT Pub. No.: WO2011/064840
PCT Pub. Date: Jun. 3, 2011

(65) Prior Publication Data
US 2012/0279237 A1    Nov. 8, 2012

(51) Int. Cl.
*F25D 21/00* (2006.01)
*F25D 21/02* (2006.01)
(Continued)

(52) U.S. Cl.
CPC ............... *F25B 25/005* (2013.01); *F24D 3/18* (2013.01); *F24D 19/0095* (2013.01);
(Continued)

(58) Field of Classification Search
CPC ............ F24D 19/0095; F24D 19/1012; F24D 2200/08; F24D 2200/12
USPC ...................................... 62/151, 80
See application file for complete search history.

(56) References Cited

U.S. PATENT DOCUMENTS 4,109,481 A * 8/1978 Peek .......................... 62/140
4,694,657 A * 9/1987 Vaughn ....................... 62/80
(Continued)

FOREIGN PATENT DOCUMENTS

JP    02-192538 A    7/1990
JP    3-211359 A    9/1991
(Continued)

OTHER PUBLICATIONS

Office Action (Notice of Rejection) issued on Oct. 1, 2013, by the Japanese Patent Office in corresponding Japanese Patent Application No. 2011-543006, and an English Translation of the Office Action. (5 pages).
(Continued)

*Primary Examiner* — M. Alexandra Elve
*Assistant Examiner* — Henry Crenshaw
(74) *Attorney, Agent, or Firm* — Buchanan Ingersoll & Rooney PC (57) ABSTRACT

An auxiliary heater control device can be readily attached to a hot water heating system configured with a simple water circuit without a hot water storage tank, and is capable of preventing freezing of circulating water such that use of an auxiliary heater is minimized. When a sensed temperature tS sensed by a temperature sensor is in a range, a control device increases a rotational speed of a circulation pump. When the sensed temperature tS is in a range, the control device increases the rotational speed of the circulation pump and lowers an operating frequency of a compressor. When the sensed temperature tS is in a range, the control device increases the rotational speed of the circulation pump, lowers the operating frequency of the compressor, and activates an auxiliary heater.

9 Claims, 6 Drawing Sheets (51) Int. Cl.

| | |
|---|---|
| *F25D 21/06* | (2006.01) |
| *F25B 25/00* | (2006.01) |
| *F24D 3/18* | (2006.01) |
| *F24D 19/00* | (2006.01) |
| *F24D 19/10* | (2006.01) |
| *F25B 49/02* | (2006.01) |

(52) U.S. Cl.
CPC ....... *F24D 19/1012* (2013.01); *F24D 19/1039* (2013.01); *F25B 49/022* (2013.01); *F24D 2200/08* (2013.01); *F24D 2200/12* (2013.01); *F25B 2339/047* (2013.01); *Y02B 30/12* (2013.01); *Y02B 30/745* (2013.01)

(56) References Cited

U.S. PATENT DOCUMENTS

| | | | | |
|---|---|---|---|---|
| 4,724,678 | A | * | 2/1988 | Pohl ................................. 62/80 |
| 5,727,395 | A | * | 3/1998 | Guo et al. ....................... 62/156 |
| 6,213,405 | B1 | * | 4/2001 | Spiegel .......................... 237/2 B |
| 7,454,919 | B2 | * | 11/2008 | Ookoshi et al. ................ 62/156 |
| 2003/0159801 | A1 | * | 8/2003 | Koenig ........................ 165/48.1 |
| 2003/0230094 | A1 | * | 12/2003 | Takano .......................... 62/150 |
| 2005/0150969 | A1 | * | 7/2005 | Nakayama et al. ............. 237/12 |
| 2007/0144187 | A1 | * | 6/2007 | Lee ................................. 62/155 |
| 2008/0092568 | A1 | | 4/2008 | Ookoshi et al. |

FOREIGN PATENT DOCUMENTS

| | | | |
|---|---|---|---|
| JP | H05-272812 | * | 10/1993 |
| JP | 2002-048399 | * | 2/2002 |
| JP | 2002-48399 | A | 2/2002 |
| JP | 2002-048399 | A | 2/2002 |
| JP | 2002-228258 | A | 8/2002 |
| JP | 2003-148816 | A | 5/2003 |
| JP | 2003-254621 | A | 9/2003 |
| JP | 2003287291 | A | 10/2003 |
| JP | 2004-060980 | A | 2/2004 |
| JP | 2004037011 | A | 2/2004 |
| JP | 2004-132612 | A | 4/2004 |
| JP | 2005-315498 | * | 11/2005 |
| JP | 2005-315498 | A | 11/2005 |
| JP | 2006105566 | A | 4/2006 |
| JP | 2007-255847 | A | 10/2007 |
| WO | WO 2006/103815 | A1 | 10/2006 |

OTHER PUBLICATIONS

Office Action (Final Rejection) issued on May 7, 2014, by the Japanese Patent Office in corresponding Japanese Patent Application No. 2011-543006 and an English translation of the Office Action. (3 pages).

International Search Report (PCT/ISA/210) issued on Feb. 16, 2010, by the Japanese Patent Office as the International Searching Authority for International Application No. PCT/JP2009/069821.

Office Action (Notice of Rejection) dated Jan. 29, 2013, issued in corresponding Japanese Patent Application No. 2011-543006, and an English Translation thereof. (4 pages).

* cited by examiner

AUXILIARY HEATER CONTROL DEVICE, HEATED FLUID UTILIZATION SYSTEM, AND AUXILIARY HEATER CONTROL METHOD

TECHNICAL FIELD

This invention relates to an auxiliary heater control device, a heated fluid utilization system, and an auxiliary heater control method in connection with prevention of freezing of circulating water during defrost operation of a heat pump heat source (hereinafter also referred to as a heat pump apparatus).

BACKGROUND ART

In a hot water heating system using a heat pump apparatus, the heat pump apparatus cools circulating water during defrost operation. Thus, various methods for preventing freezing of the circulating water have been invented.

For example, there are methods for preventing the freezing of the circulating water such that an auxiliary heater is always activated during the defrost operation of the heat pump apparatus, or such that the auxiliary heater is activated when a temperature of the circulating water is at or below a freezing determination temperature, and so on.

For a water heater and hot water heating system capable of supplying hot water, there is a method for preventing the freezing of the circulating water by using high-temperature water in a hot water storage tank.

(Use of an Auxiliary Heater)

However, an auxiliary heater requires a large amount of power. For this reason, in terms of saving energy, it is desirable to minimize use of the above-described methods, that is, the method in which the auxiliary heater is always activated during the defrost operation of the heat pump apparatus, or the method in which the auxiliary heater is activated when the temperature of the circulating water is at or below the freezing determination temperature.

(Presence of a Hot Water Storage Tank)

In the above-described method using the high-temperature water in the hot water storage tank, it is a prerequisite that there exists a hot water storage tank in a water heater and hot water heating system capable of supplying hot water. For this reason, this method cannot be applied to a hot water heating system configured with a simple water circuit in which a heat pump apparatus, a circulation pump, and a hot water heating appliance are connected circularly with pipes.

Patent Document 1 relates to prior art for reducing use of the auxiliary heater. Patent Document 1 discloses a control method for preventing an auxiliary heat source from unnecessarily being activated during defrost operation of a heat pump heat source in a hot water heating system. In Patent Document 1, whether to turn on or off the auxiliary heater is determined based on each instance of temperature information of the hot water heating system.

However, the technology discussed in Patent Document 1 controls only the auxiliary heater, so that it is inadequate in terms of reducing use of the auxiliary heater and promoting energy saving.

CITATION LIST

Patent Documents

[Patent Document 1] JP 2004-132612 A

DISCLOSURE OF INVENTION

Technical Problem

It is an object of the present invention to provide an apparatus that can be readily attached to a simple water circuit configuration without a hot water storage tank, that can reliably prevent freezing of circulating water, and that can reduce use of an auxiliary heater.

Solution to Problem

An auxiliary heater control device according to the present invention includes a temperature sensor that senses a temperature of a fluid of a fluid circulation circuit for circulating the fluid, the fluid circulation circuit being configured by connecting, in order, a heat pump apparatus performing defrost operation in addition to normal operation and including a compressor that is controllable, an auxiliary heater that is controllable, a heated fluid utilization apparatus that utilizes the fluid heated by the normal operation of the heat pump apparatus, and a circulation pump that is controllable and circulates the fluid from the auxiliary heater to the heated fluid utilization apparatus, the temperature sensor sensing the temperature of the fluid flowing between the auxiliary heater and the heated fluid utilization apparatus; and a control unit that monitors a sensed temperature tS sensed by the temperature sensor during the defrost operation of the heat pump apparatus, and selectively controls at least one of the circulation pump, the compressor, and the auxiliary heater according to the sensed temperature tS.

Advantageous Effects of Invention

The present invention can provide an apparatus that can be readily attached to a simple water circuit configuration without a hot water storage tank, that can reliably prevent freezing of circulating water, and that can minimize use of an auxiliary heater.

DESCRIPTION OF EMBODIMENTS

First Embodiment

Figure 1:
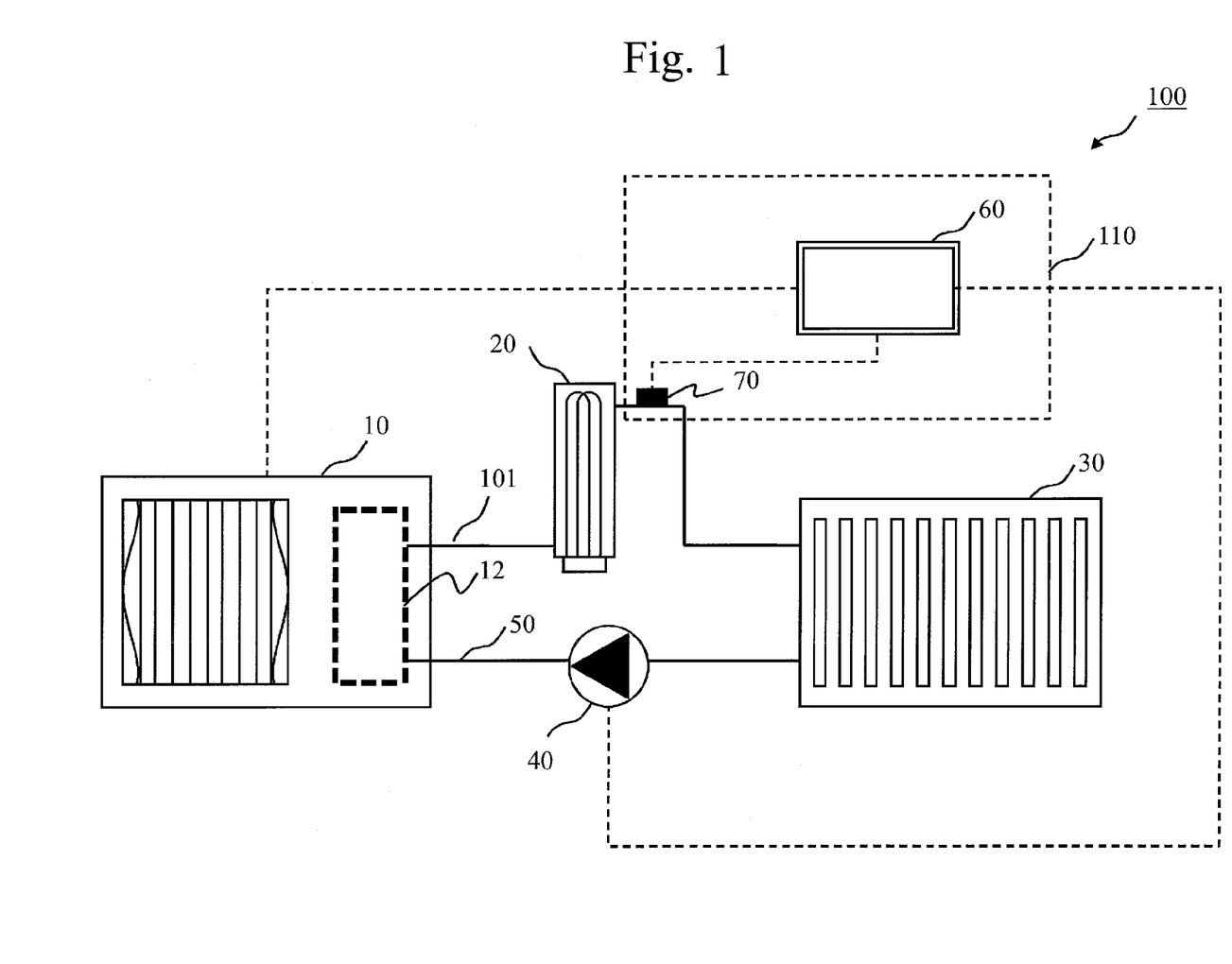
FIG. 1 is a diagram showing a configuration of a hot water heating system 100 according to a first embodiment.

FIG. 1 is a water circuit diagram showing a hot water heating system 100 (a heated fluid utilization system) according to a first embodiment.

(System Configuration)

The hot water heating system 100 consists of a heat pump apparatus 10, an auxiliary heater 20, a hot water heating appliance 30 (an example of a heated fluid utilization apparatus), a circulation pump 40, and water channel forming means 50 (pipes, for example) for connecting these components. The heat pump apparatus 10 is a heat source that heats water circulating in a water circuit during normal operation. The auxiliary heater 20 is an auxiliary heat source that heats circulating water during defrost operation of the heat pump apparatus 10. The hot water heating appliance 30 is an example of a heated fluid utilization apparatus that utilizes hot water. The hot water heating appliance 30 may be a radiator, a fan coil unit, a floor heater, or the like. The hot water heating appliance 30 may be replaced by a hot water storage tank.

(Water Circuit 101)

As shown in FIG. 1, a water circuit 101 (a fluid circulation circuit) for circulating the hot water is configured by connecting, in order, the heat pump apparatus 10, the auxiliary heater 20 that is controllable, the hot water heating appliance 30 that utilizes the hot water heated by the normal operation of the heat pump apparatus 10, and the circulation pump 40 that is controllable and circulates the hot water from the auxiliary heater 20 to the hot water heating appliance 30. The auxiliary heater 20 and the circulation pump 40 can be controlled by a control device 60 to be described later.

(Configuration of the Heat Pump Apparatus 10)

Figure 2:
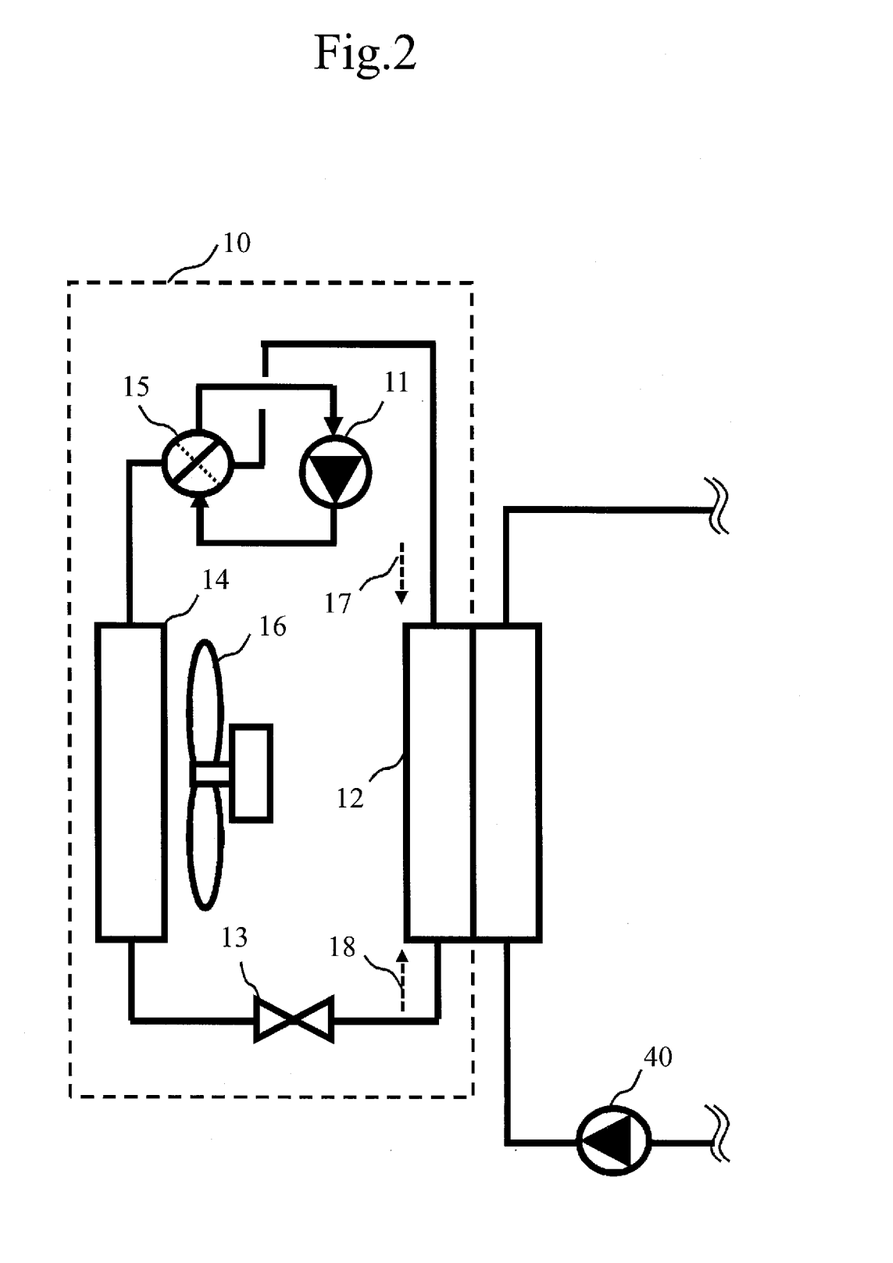
FIG. 2 is a diagram showing a configuration of a heat pump apparatus 10 according to the first embodiment.

FIG. 2 is a diagram showing an example configuration of the heat pump apparatus 10. The heat pump apparatus 10 consists of a compressor 11, a first heat exchanger 12 that functions as a radiator during the normal operation, an expansion mechanism 13, a second heat exchanger 14 that functions as a heat sink during the normal operation, a switching device 15 (a four-way valve, for example) that switches a circulation direction of a refrigerant, and a fan 16. During the normal operation, the heat pump apparatus 10 supplies to the first heat exchanger 12 a high-temperature and high-pressure refrigerant 17 compressed at the compressor 11. During the defrost operation, the heat pump apparatus 10 supplies to the second heat exchanger 14 the high-temperature and high-pressure refrigerant compressed at the compressor 11, and a refrigerant 18 flows from the expansion mechanism 13 into the first heat exchanger 12. An operating frequency of the compressor 11 can be controlled by the control device 60 to be described later.

(Control Device 60, Temperature Sensor 70)

The hot water heating system 100 further includes the control device 60 (an example of a control unit). The hot water heating system 100 also includes a temperature sensor 70. The temperature sensor 70 is placed at a pipe connecting the auxiliary heater 20 and the hot water heating appliance 30. The temperature sensor 70 is a sensor that measures a temperature of the hot water flowing from the auxiliary heater 20 to the hot water heating appliance 30.

(Auxiliary Heater Control Device 110)

The control device 60 and the temperature sensor 70 constitute an auxiliary heater control device 110. The auxiliary heater control device 110 can be readily attached to a simple hot water heating system without a hot water storage tank.

(Functions of the Control Device 60)

During the defrost operation of the heat pump apparatus 10, the control device 60 controls the following operations based on measurement information (a sensed temperature tS) of the temperature sensor 70: increasing a rotational speed of the heat pump apparatus 10, lowering the operating frequency of the heat pump apparatus 10 (the compressor), and activating the auxiliary heater 20.

(Water Cycle)

A water cycle in the hot water heating system 100 will now be described. During the normal operation of the hot water heating system 100, the circulation pump 40 causes the hot water to circulate in the water circuit 101. The hot water discharged from the circulation pump 40 is heated by the heat pump apparatus 10. The heated hot water is supplied to the hot water heating appliance 30 via the auxiliary heater 20, and heat from the hot water is radiated. The hot water from which heat has been radiated is drawn into the circulation pump 40.

(Defrost Operation by the Heat Pump Apparatus 10)

When the heat pump apparatus 10 starts the defrost operation, the hot water discharged from the circulation pump 40 is cooled at the heat pump apparatus 10. That is, the heat pump apparatus 10 operates in a reverse cycle mode. The water cooled at the heat pump apparatus 10 passes through the auxiliary heater 20 and the hot water heating appliance 30, and is drawn into the circulation pump 40. At this time, at the hot water heating appliance 30, when the temperature of the supplied water is lower than the temperature of a space in which the hot water heating appliance 30 is installed, the water is heated by heat from the space.

(First Anti-Freezing Control Method)

Figure 3:
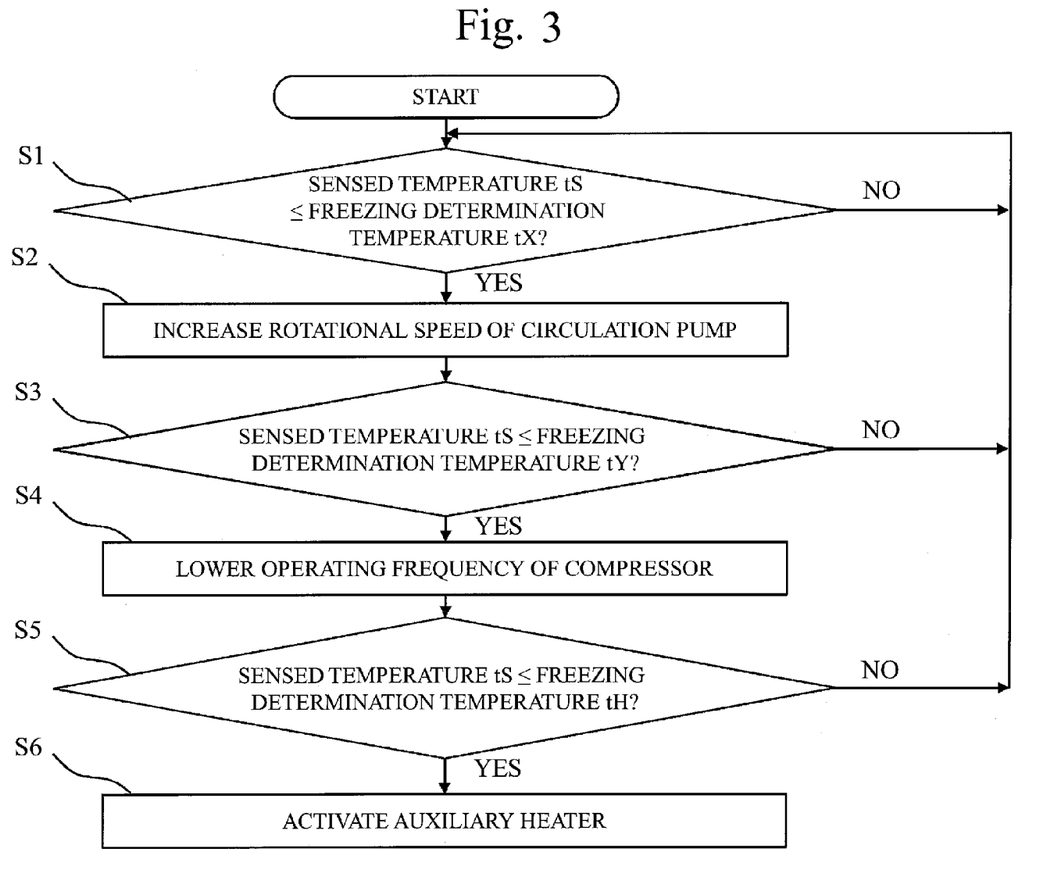
FIG. 3 is a flowchart of operations of a control device 60 according to the first embodiment.
Figure 4:
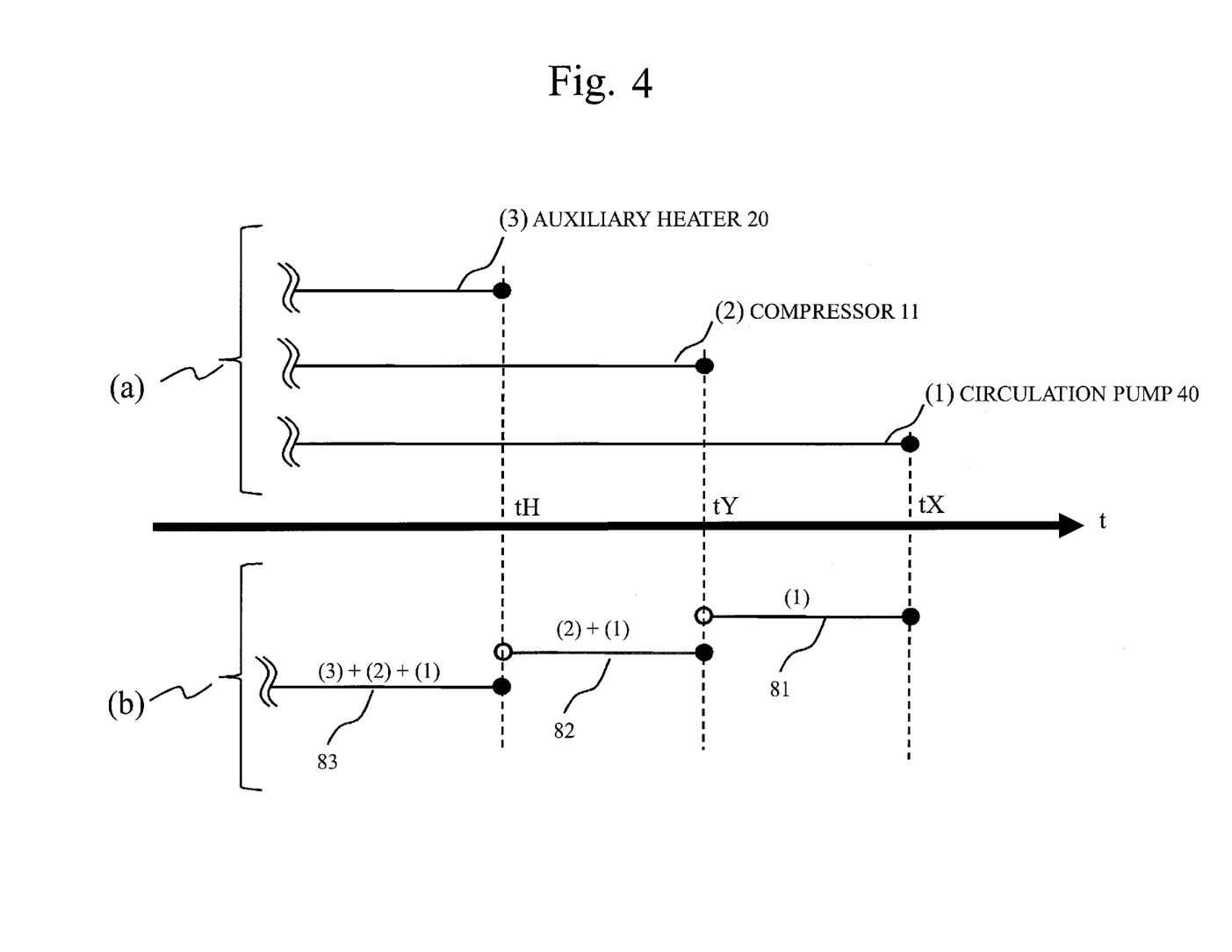
FIG. 4 is a diagram showing a first anti-freezing control method of the control device 60 according to the first embodiment.

FIG. 3 is a flowchart showing operations of the control device 60 when the heat pump apparatus 10 starts the defrost operation. FIG. 4 is a diagram showing a control method of the control device 60. Referring to FIGS. 3 and 4, a first anti-freezing control method of the control device 60 during the defrost operation of the heat pump apparatus 10 will be described.

In FIG. 4, a range (a) above a temperature axis t shows devices to be controlled. In the range (a), a bottom line represents the circulation pump 40, a middle line represents the compressor 11, and a top line represents the auxiliary heater 20. A range (b) under the temperature axis t shows temperature ranges. That is, FIG. 4 shows the following:

The control device 60 controls only the circulation pump 40 when $tY \leq tS \leq tX$;

controls the circulation pump 40 and the compressor 11 when $tH < tS \leq tY$; and controls the circulation pump 40, the compressor 11, and the auxiliary heater 20 when $tS \leq tH$, where tS: sensed temperature sensed by the temperature sensor 70, tX: predetermined temperature at which to start control of either the circulation pump 40 or the compressor 11, tY: predetermined temperature lower than tX and higher than tH, and tH: predetermined temperature at which to start control of the auxiliary heater 20, and where $$tH < tY < tX.$$

Referring to the flowchart in FIG. 3, a detailed description will be given.

(Step S1: tX Determination Step)

At step S1 of FIG. 3, the control device 60 determines whether the sensed temperature tS sensed by the temperature sensor 70 is at or below a first freezing determination temperature tX. If the sensed temperature tS is at or below the freezing determination temperature tX, the control device 60 increases the rotational speed of the circulation pump 40 at step S2, and then proceeds to step S3 which is a determination step. As shown in FIG. 4,
when "tS≤tX",
at least the circulation pump 40 is to be controlled by the control device 60.

(Effect of Increasing the Rotational Speed of the Circulation Pump 40)

Let Q be a water cooling capability by defrosting;
let L be a flow volume of the circulating water; and
let Δt be a difference in water temperature between at an inlet and at an outlet of a heat pump heat source 1, where "$Q \propto L \times \Delta t$".

That is, the water cooling capability Q is proportional to a product of L (the flow volume of the circulating water) and Δt (the difference in the water temperature between at the inlet and at the outlet). Accordingly, as the water cooling capability by defrosting is constant, increasing the rotational speed of the circulation pump 40 increases the flow volume of the circulating water, so that the difference in the water temperature between the inlet and the outlet of the heat pump apparatus 10 decreases. That is, for example, when the water temperature at the inlet is 15° C. and the water temperature at the outlet is 5° C. in the heat pump apparatus 10, doubling the flow volume of the circulating water causes the water temperature at the outlet to be at 10° C. Thus, by increasing the rotational speed of the circulation pump 40, the water temperature can be made to decrease to a reduced degree. If the sensed temperature sensed by the temperature sensor 70 is not at or below the freezing determination temperature tX, the control device 60 maintains the rotational speed of the circulation pump 40 and returns to step S1 again.

(Step S3: tY Determination Step)

After the rotational speed of the circulation pump 40 is increased at step S2, the control device 60 determines whether the sensed temperature tS is at or below a second freezing determination temperature tY at step S3. If the sensed temperature tS is at or below the second freezing determination temperature tY, the control device 60 lowers the operating frequency of the compressor 11 at step S4 and proceeds to step S5. Lowering the operating frequency of the compressor 11 causes the water cooling capability to be reduced. Thus, when the water cooling capability becomes equal to a water heating capability by the heat in the space generated by the hot water heating appliance 30, the defrost operation can be continued without the water temperature being lowered further. If the sensed temperature tS is not at or below the second freezing determination temperature tY, the control device 60 maintains the operating frequency of the compressor 11 and returns to step S1 again.

(Step S5: tH Determination Step)

After the operating frequency of the compressor 11 is lowered at step S4, the control device 60 determines whether the sensed temperature tS is at or below a third freezing determination temperature tH at step S5. If the water temperature decreases further even after the operating frequency of the compressor 11 has been lowered to a certain degree at step S4 and the sensed temperature tS is at or below the third freezing determination temperature tH, the control device 60 "activates" the auxiliary heater 20 for the first time at step S6. In this case, if the auxiliary heater 20 has been previously "ON", the control at this step may be arranged such that output of the auxiliary heater 20 is controlled. If the sensed temperature tS is not at or below the third freezing determination temperature tH, the control device 60 maintains the auxiliary heater 20 in an "OFF state" and returns to step S1 again.

In the first embodiment, the flowchart in FIG. 3 is provided as an example. However, the configuration may be arranged as described below. The control device 60 identifies whether the sensed temperature tS belongs to a range 81, a range 82, or a range 83 in FIG. 4. The control device 60 has a correspondence table listing temperature ranges and corresponding control details. Using the sensed temperature tS as a key, the control device 60 identifies control details based on the correspondence table. For example, if the temperature range 82 is identified from the sensed temperature tS, the control device 60 controls both the circulation pump 40 and the compressor 11. That is, the control device 60 monitors the sensed temperature tS sensed by the temperature sensor 70 during the defrost operation of the heat pump apparatus 10, and selectively controls at least one of the circulation pump 40, the compressor 11, and the auxiliary heater 20 according to the sensed temperature tS.

As described above, during the defrost operation of the heat pump apparatus 10, the auxiliary heater control device 110 of the hot water heating system 100 functions as described below according to a sensed value of the temperature sensor 70. That is, the control device 60 controls three types of operation, namely, increasing the rotational speed of the circulation pump 40, lowering the operating frequency of the compressor 11, and activating the auxiliary heater 20, by one of the following control methods: a control method controlling the circulation pump, a control method controlling the circulation pump and the compressor, and a control method controlling the circulation pump, the compressor, and the auxiliary heater. In this way, as preliminary steps prior to activating the auxiliary heater 20, the water temperature can be prevented from decreasing by controlling the rotational speed of the circulation pump 40 and controlling the operating frequency of the compressor 11. Therefore, even for a hot water heating system configured with a simple water circuit without a hot water storage tank, it is ensured that the circulating water can be prevented from freezing. Use of the auxiliary heater can also be minimized.

Second Embodiment

Figure 5:
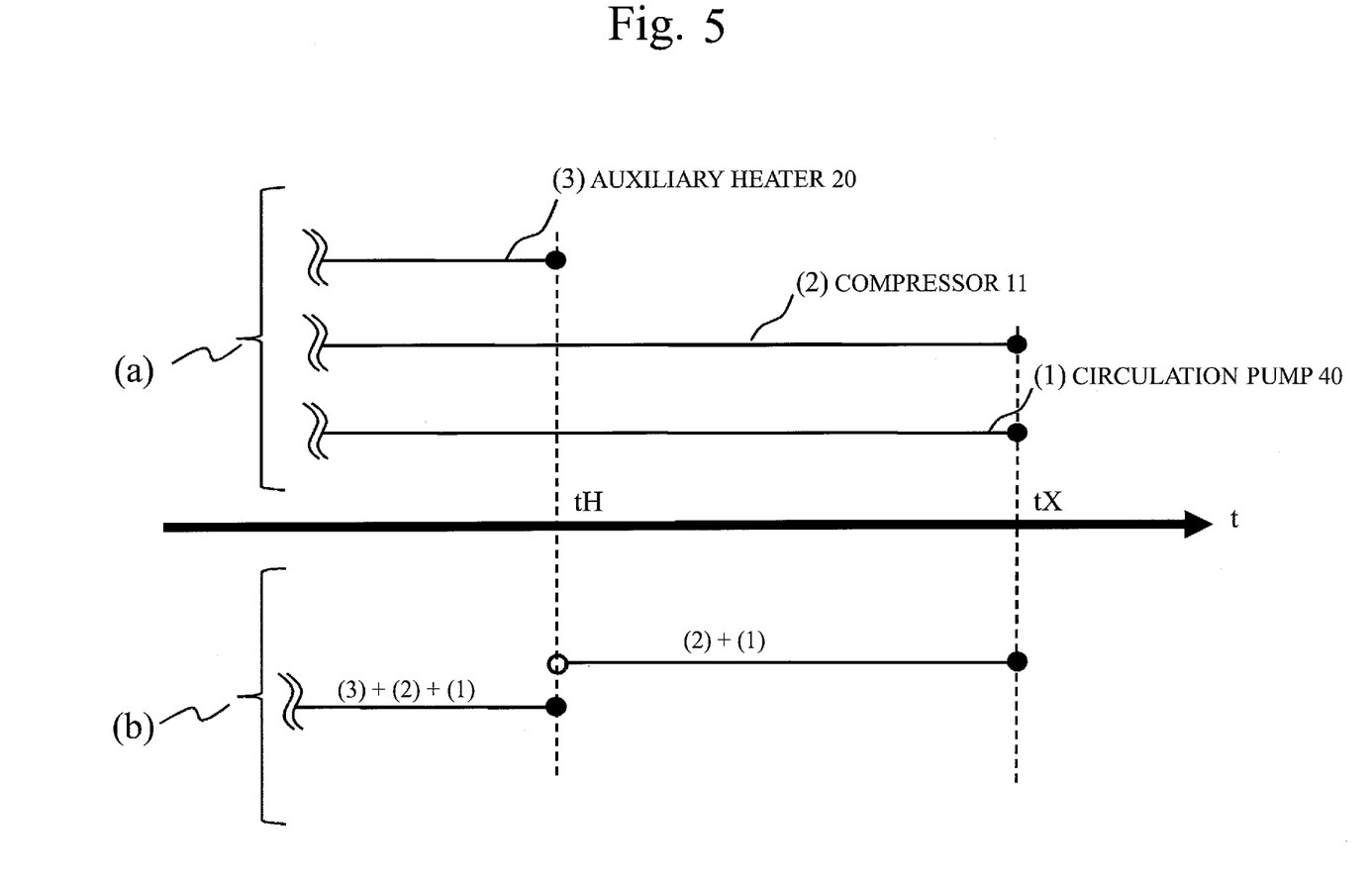
FIG. 5 is a diagram showing a second anti-freezing control method of the control device 60 according to a second embodiment.

Referring to FIG. 5, a "second anti-freezing control method" of a second embodiment will be described. In the second embodiment, both the circulation pump 40 and the compressor 11 are to be controlled when the sensed temperature tS sensed by the temperature sensor 70 is "$tH<tS\leq tX$".

In FIG. 5, the range "(1)" of FIG. 4 is not present. Therefore, the effect of preventing the temperature from decreasing prior to using the auxiliary heater 20 can be promptly obtained.

Third Embodiment

Figure 6:
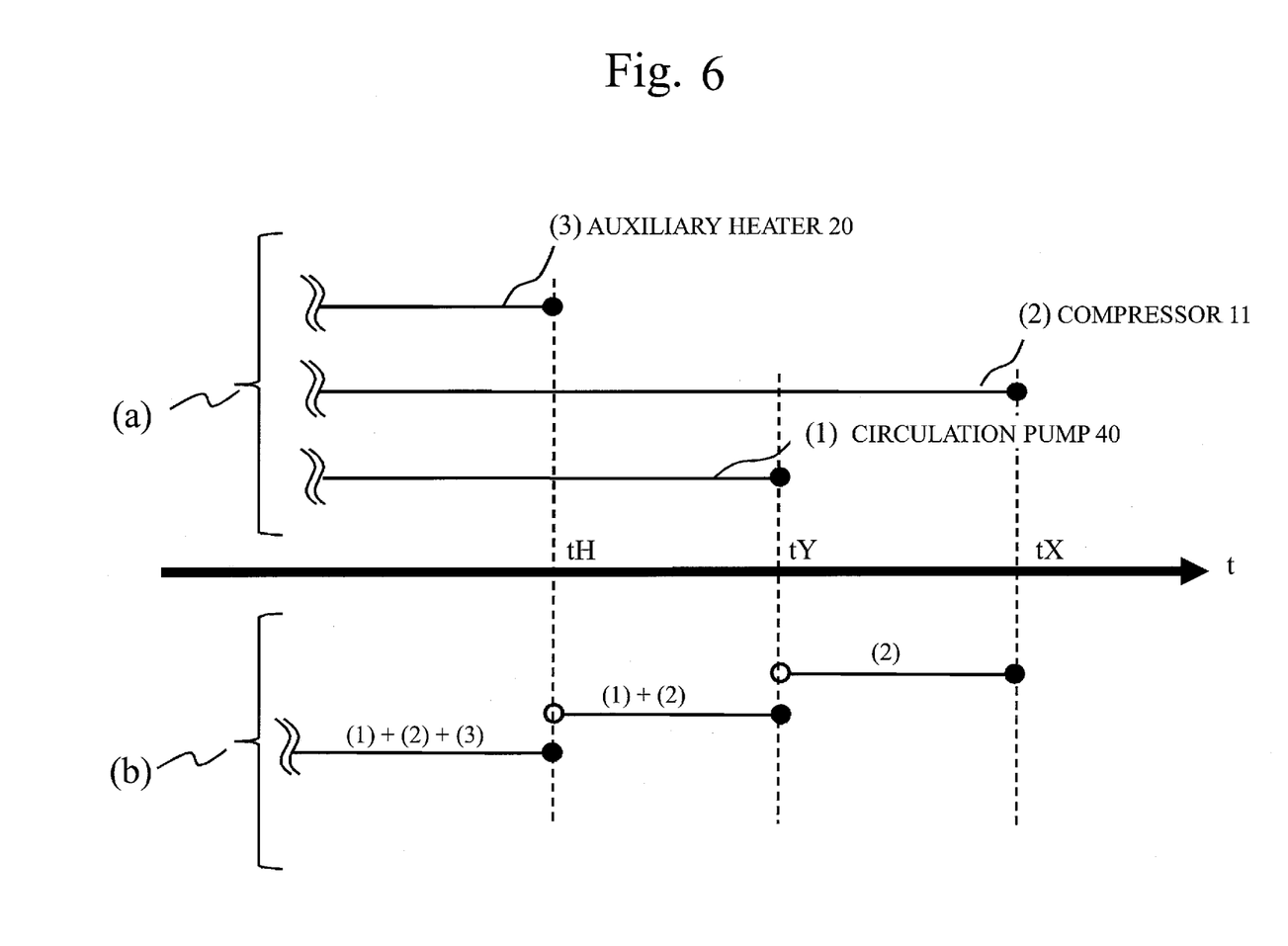
FIG. 6 is a diagram showing a third anti-freezing control method of the control device 60 according to a third embodiment.

Referring to FIG. 6, a "third anti-freezing control method" of a third embodiment will be described. The third embodiment concerns a method that differs from the first embodiment in that control of the circulation pump 40 and control of the compressor 11 are interchanged.

That is, the control device 60 controls the operating frequency of the compressor 11 when tY<tS≤tX.

The control device 60 controls the compressor 11 and controls the rotational speed of the circulation pump 40 when tH<tS≤tY.

The control device 60 controls the compressor 11, controls the circulation pump 40, and controls activating the auxiliary heater 20 when tS≤tH.

In the third embodiment, the compressor 11 and the circulation pump 40 are controlled as preliminary steps prior to activating the auxiliary heater 20, so that energy associated with activating the auxiliary heater can be reduced.

In the first to third embodiments, the temperatures tX, tY, and tH are used as criteria for determination. The temperatures tX and tY of these temperatures, for example, can be set to desired temperatures as appropriate to each of the first to third anti-freezing control methods. That is, the temperatures tX and tY may be set to the same values for all of the anti-freezing control methods, or may be set to different values for each of the anti-freezing control methods.

In the first to third embodiments, the auxiliary heater control device 110 has been described. By treating operations of the temperature sensor 70 and the control device 60 of the auxiliary heater control device 110 as steps, the auxiliary heater control device 110 may be regarded as an auxiliary heater control method.

REFERENCE SIGNS LIST

10: heat pump apparatus, 11: compressor, 12: first heat exchanger, 13: expansion mechanism, 14: second heat exchanger, 15: four-way valve, 16: fan, 20: auxiliary heater, 30: hat water heating appliance, 40: circulation pump, 50: water channel forming means, 60: control device, 70: temperature sensor, 81 to 83: temperature ranges, 100: hot water heating system, 110: auxiliary heater control device

The invention claimed is:

1. An auxiliary heater control device for an auxiliary heater arranged in a fluid circulation circuit for circulating a fluid, the fluid circulation circuit including in a fluid circulation direction,
  a heat exchanger of a heat pump apparatus, the heat pump apparatus configured to perform a defrost operation and a normal heat pump operation wherein the heat pump apparatus includes
    a compressor,
    the auxiliary heater,
    a heated fluid utilization apparatus that utilizes the fluid heated by the normal operation of the heat pump apparatus, and
    a circulation pump that circulates the fluid in the fluid circulation circuit, the auxiliary heater control device comprising:
  a temperature sensor sensing the temperature of the fluid flowing between the auxiliary heater and the heated fluid utilization apparatus; and
  a control unit that monitors the sensed temperature tS sensed by the temperature sensor during the defrost operation of the heat pump apparatus, and is configured to selectively control at least one of the circulation pump, the compressor, and the auxiliary heater according to the sensed temperature tS,
  wherein the control unit controls at least one of the circulation pump to increase a rotational speed and controls the compressor to lower an operating frequency when the sensed temperature tS sensed by the temperature sensor is at or below a temperature tX and above a temperature tH, the temperature tX being a predetermined temperature at which to start control of at least one of the circulation pump to increase a rotational speed and the compressor to lower an operating frequency, and the temperature tH being a predetermined temperature which is lower than the temperature tX and at which to start the auxiliary heater, and
  wherein the control unit controls the circulation pump to increase the rotational speed, controls the compressor to lower an operating frequency, and starts the auxiliary heater when the sensed temperature tS is at or below the temperature tH,
  wherein the control unit controls the circulation pump to increase a rotational speed when the sensed temperature tS is above a predetermined temperature tY between the temperature tX and the temperature tH and at or below the temperature tX, and
  wherein the control unit controls the circulation pump to increase the rotational speed and controls the compressor to lower an operating frequency when the sensed temperature tS is at or below the temperature tY and above the temperature tH.

2. The auxiliary heater control device of claim 1, wherein the control unit controls both the circulation pump to increase rotational speed and controls the compressor to lower an operating frequency when the sensed temperature tS is at or below the temperature tX and above the temperature tH.

3. The auxiliary heater control device of claim 1, wherein the control unit controls the compressor to lower an operating frequency when the sensed temperature tS is above the predetermined temperature tY between the temperature tX and the temperature tH and at or below the temperature tX, and
  wherein the control unit controls the compressor to lower an operating frequency and controls the circulation pump to increase the rotational speed when the sensed temperature tS is at or below the temperature tY and above the temperature tH.

4. A heated fluid utilization system, comprising:
  a fluid circulation circuit for circulating a fluid, the fluid circulation circuit including in a fluid circulation direction:
    a heat exchanger of a heat pump apparatus, the heat pump apparatus configured to perform a defrost operation and a normal heat pump operation, wherein the heat pump apparatus includes a compressor;
    an auxiliary heater;
    a heated fluid utilization apparatus that utilizes the fluid heated by the normal operation of the heat pump apparatus; and
    a circulation pump that circulates the fluid in the fluid circulation circuit;
  a temperature sensor that senses a temperature of the fluid flowing between the auxiliary heater and the heated fluid utilization apparatus; and
  a control unit that monitors the sensed temperature tS sensed by the temperature sensor during the defrost operation of the heat pump apparatus, and is configured to selectively control at least one of the circulation pump, the compressor, and the auxiliary heater according to the sensed temperature tS;
  wherein the control unit controls one of the circulation pump to increase a rotational speed and the compressor to lower an operating frequency when the sensed temperature tS sensed by the temperature sensor is at or below a temperature tX and above a temperature tH, the temperature tX being a predetermined temperature at which to start control of at least one of the circulation pump to increase a rotational speed and the compressor to lower an operating frequency, and the temperature tH being a predetermined temperature which is lower than the temperature tX and at which to start the auxiliary heater, and wherein the control unit controls the circulation pump to increase a rotational speed, the compressor to lower an operating frequency, and starts the auxiliary heater when the sensed temperature tS is at or below the temperature tH;

wherein the control unit controls the circulation pump to increase a rotational speed when the sensed temperature tS is above a predetermined temperature tY between the temperature tX and the temperature tH and at or below the temperature tX, and wherein the control unit controls the circulation pump to increase a rotational speed and controls the compressor to lower an operating frequency when the sensed temperature tS is at or below the temperature tY and above the temperature tH.

5. The heated fluid utilization system of claim 4, wherein the control unit controls both the circulation pump to increase a rotational speed and controls the compressor to lower an operating frequency when the sensed temperature tS is at or below the temperature tX and above the temperature tH.

6. The heated fluid utilization system of claim 4, wherein the control unit controls the compressor to lower an operating frequency when the sensed temperature tS is above the predetermined temperature tY between the temperature tX and the temperature tH and at or below the temperature tX, and wherein the control unit controls the compressor to lower an operating frequency and controls the circulation pump to increase a rotational speed when the sensed temperature tS is at or below the temperature tY and above the temperature tH.

7. An auxiliary heater control method for an auxiliary heater arranged in a fluid circulation circuit for circulating a fluid, the fluid circulation circuit including in a fluid circulation direction, a heat exchanger of a heat pump apparatus, the heat pump apparatus configured to perform a defrost operation and a normal heat pump operation wherein the heat pump apparatus includes a compressor, the auxiliary heater, a heated fluid utilization apparatus that utilizes the fluid heated by the normal operation of the heat pump apparatus, and a circulation pump that circulates the fluid in the fluid circulation circuit, the method comprising:

sensing a temperature of the fluid flowing between the auxiliary heater and the heated fluid utilization apparatus;

monitoring the sensed temperature tS during the defrost operation of the heat pump apparatus, and selectively controlling at least one of the circulation pump, the compressor, and the auxiliary heater according to the sensed temperature tS;

controlling at least one of the circulation pump to increase a rotational speed and the compressor to lower an operating frequency when the sensed temperature tS is at or below a temperature tX and above a temperature tH, the temperature tX being a predetermined temperature at which to start control of at least one of the circulation pump to increase a rotational speed and the compressor to lower an operating frequency, and the temperature tH being a predetermined temperature which is lower than the temperature tX and at which to start auxiliary heater; and controlling the circulation pump to increase a rotational speed, controlling the compressor to lower an operating frequency, and starting the auxiliary heater when the sensed temperature tS is at or below the temperature tH;

controlling the circulation pump to increase a rotational speed when the sensed temperature tS is above a predetermined temperature tY between the temperature tX and the temperature tH and at or below the temperature tX; and controlling the circulation pump to increase a rotational speed and controlling the compressor to lower an operation frequency when the sensed temperature tS is at or below the temperature tY and above the temperature tH.

8. The auxiliary heater control method of claim 1, comprising:

controlling both the circulation pump to increase a rotational speed and controlling the compressor to lower an operating frequency when the sensed temperature tS is at or below the temperature tX and above the temperature tH.

9. The auxiliary heater control method of claim 7, comprising:

controlling the compressor to lower an operation frequency when the sensed temperature tS is above the predetermined temperature tY between the temperature tX and the temperature tH and at or below the temperature tX; and controlling the compressor to lower an operating frequency and controlling the circulation pump to increase a rotational speed when the sensed temperature tS is at or below the temperature tY and above the temperature tH.

* * * * *